United States Patent [19]

Makino et al.

[11] 3,860,185
[45] Jan. 14, 1975

[54] ROTATION DETECTOR IN A FIXED LENGTH YARN WINDING APPARATUS

[75] Inventors: Shozaburo Makino, Kawasaki; Seiji Otobe, Yono; Shinichi Yamamoto, Tokyo, all of Japan

[73] Assignee: Nippon-Seren Co., Ltd., Nakahara-ku, Kawasaki City, Kanagawa Prefecture, Japan

[22] Filed: Dec. 28, 1973

[21] Appl. No.: 429,282

[52] U.S. Cl. ............... 242/36, 242/19, 242/39
[51] Int. Cl. .......................................... B65h 63/00
[58] Field of Search .................. 242/36–39, 242/18 DD, 43.1, 19

[56] References Cited
UNITED STATES PATENTS

| | | | |
|---|---|---|---|
| 3,148,814 | 9/1964 | Studer | 242/36 UX |
| 3,476,329 | 11/1969 | Felix | 242/36 |
| 3,633,835 | 1/1972 | Beers | 242/36 |
| 3,739,996 | 6/1973 | Matsui et al. | 242/36 X |
| 3,774,860 | 11/1973 | Loepfe | 242/36 |

*Primary Examiner*—Stanley N. Gilreath
*Attorney, Agent, or Firm*—Laurence R. Brown

[57] ABSTRACT

A detector wherein detecting element is opposed to the peripheral side of a drum so that a magnetic or optical variation may be given whenever a screw fixing the shaft of said drum passes and that therefore the rotation may be accurately detected without detecting the number of revolutions of each drum or attaching any additional element as in the conventional technique.

7 Claims, 4 Drawing Figures

PATENTED JAN 14 1975 3,860,185

ROTATION DETECTOR IN A FIXED LENGTH YARN WINDING APPARATUS

This invention relates to a rotation detector in a fixed length yarn winding apparatus.

It is known, for example, from the publication of Japanese utility model publication No. 24090/1965 to measure the length of a wound yarn by detecting the number of revolutions of a drum in a yarn winding machine. A means wherein an electric generator is connected with a drum driving shaft has been already adopted. However, in a fully automatic winder, when different drums are connected with the driving shaft by a frictional power transmission, their numbers of revolutions are not identical. Therefore, the number of revolutions of each drum must be detected. The number of revolutions of such drum is made so high today that, if an element for detecting the rotation is added to the drum, the balance of the rotation will be broken, a vibration will be caused and the performance of the apparatus will reduce.

An object of the present invention is to provide a device for detecting the rotation of each drum in a fully automatic winder without attaching any other element for detecting the rotation to the drum.

Figures 1, 2:
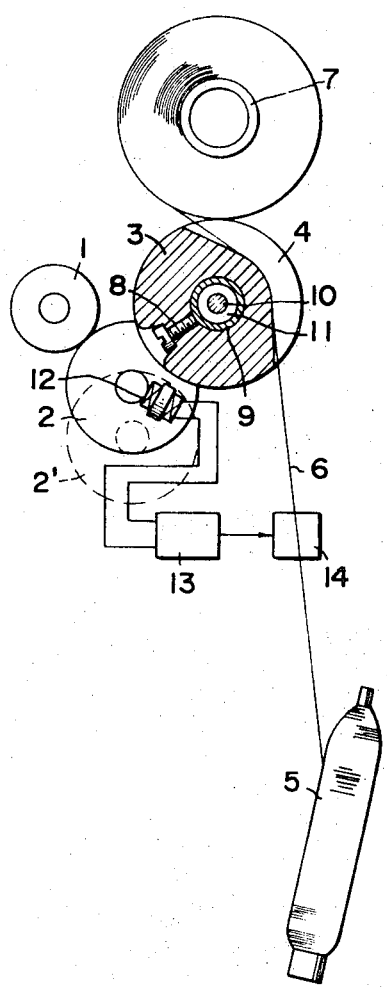
FIG. 1 is a vertically sectioned side view of a part of an embodiment of the detector according to the present invention.
FIG. 2 is an elevation of the part in FIG. 1.

A drum 3 is connected by a frictional power transmission through a connecting roll 2 with a driving wheel 1 connected directly with a prime mover. The drum 3 is formed of aluminum, is provided with spiral grooves 4 on the periphery and has a bobbin 7 frictionally engaging the periphery for rotation therewith to wind up a yarn 6 from a cop 5. Further, the drum 3 has a tubular shaft 9 fixed to it with a screw 8 screwed in the radial direction from its peripheral side. Ball bearings 11 fitted to a suporting rod 10 are inserted in this tubular shaft to rotatably hold said drum. That is to say, in this embodiment, the above mentioned screw 8 is magnetized and a pick-up coil 12 of a detecting element is opposed to the peripheral side of the drum 3. Therefore, whenever the head part of the magnetized screw 8 passes near this coil 12, a magnetic flux will cross said coil and a voltage will be induced between both ends of the coil. when these signal pulses are applied to a frequency divider 13 and the number of pulses reaches a fixed number, a cutter 14 for the yarn 6 will be operated. That is to say, as the peripheral length of the drum 3 is constant and there is substantially no slip between the drum and yarn 6, the length of the yarn wound up on the bobbin is proportional to the number of revolutions of the drum. By each rotation of the drum, one signal pulse is generated in the coil 12. Therefore, by counting the number of the above mentioned pulses, the length of the wound yarn can be known.

By the way, in order to stop the winding of the yarn, it is possible not only to move the roll 2 as in the broken line 2' with the output signal of the frequency divider 13 but also to operate a controlling device for braking, without operating the cutter 14.

Figure 3:
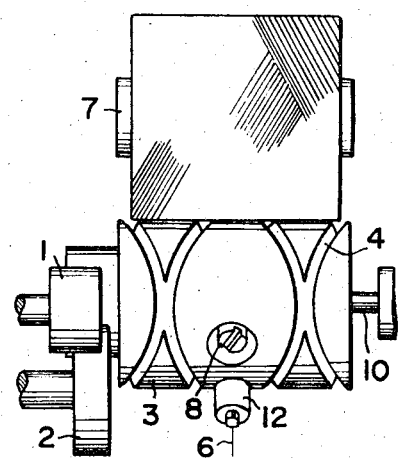
FIG. 3 is vertically sectioned side view of a part of another embodiment of the present invention.

Further, in FIG. 3 of another embodiment of the present invention; the screw 8 to fix the shaft 9 of the drum 3 is of a magnetic material and is not magnetized and the coil 12 is provided with a U-shaped magnetic core 15 in part of which a permanent magnet 16 is inserted. That is to say, as the amount of the magnetic flux passing through the magnetic path including core 15 through coil 12 will vary due to reluctance changes in the field supplied by the magnet 16 whenever the screw 8 passes near the coil 12, a signal voltage will be induced in said coil. These signal pulses are frequency-divided as in the apparatus in FIG. 1 to drive a cutter or any other controlling device.

Figure 4:
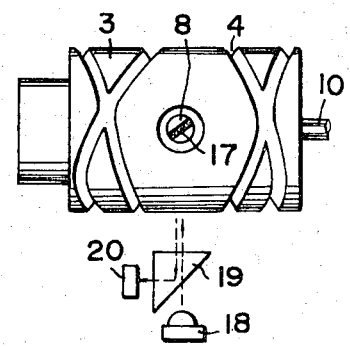
FIG. 4 is an elevation of still another embodiment of the present invention.

In FIG. 4 of still another embodiment of the present invention, the screw 8 of the drum 3 need not be of a magnetic material and the rate of light reflection in the head part of the screw may well be different from that on the peripheral side of the drum. Therefore, as required, a light reflecting layer 17 is formed in the head part of the screw 8. Such light source 18 as a luminous diode, a prism 19 and such proper photoelectric converter 20 as a phototransistor are placed adjacent the peripheral side of the drum. That is to say, as shown by the dotted line arrows, a light projected from the light source 18 is incident on the peripheral side of the drum 3 through the prism 19 and the reflected light is reflected by the prism 19 and is incident on the photoelectric converter 20. Therefore, whenever the screw 8 comes to be opposite the detecting element consisting of the above mentioned light source 18, prism 19 and photoelectric converter 20, the photoelectric converter will send out signal pulses.

As explained above with the embodiments, the present invention is magnetically or optionally detect the rotation of a drum by utilizing a screw for fixing the shaft of said drum. Therefore, there is no need of attaching an element for detecting the rotation of the drum, therefore, there is no fear of braking the balance of the rotation and it is easy to fit the detecting device. If the peripheral side of the drum is painted with a paint or the like, the friction with the yarn wound up on the bobbin will vary, there will be a bad influence and the paint or the like will wear and vanish within a short period. Further, if the side of the drum is utilized, the clearance between it and another part will be so narrow that it will be difficult to fit the detecting element. However, in the present invention, as it is opposed to the peripheral side, it is easy to fit and there is no fear of deteriorating the detecting function.

What is claimed is:

1. A rotation detector in a fixed length yarn winding apparatus comprising a drum engaging a bobbin for winding up yarn, a shaft through said drum rotatable therewith, a screw extending in the radial direction into said drum to fix the shaft to said drum and a detecting element adjacent to the peripheral side of said drum, said detecting element sensing the screw and producing signal pulses whenever the head part of said screw passes.

2. A detector according to claim 1 wherein said detecting element comprises a pick-up coil connected with a wound yarn stopping means through a frequency divider.

3. A detector according to claim 2 wherein said stopping means is a cutter.

4. A detector according to claim 2 wherein said stopping means is a controlling device operating to move a roll connecting said drum with a driving means.

5. A detector according to claim 2 wherein said screw is formed of a magnetic material, said coil is provided with a U-shaped magnetic core and a permanent magnet is inserted in a part of said magnetic core.

6. A detector according to claim 1 wherein a light reflecting layer is formed at least in the head part of said screw and said detecting element comprises a light source, prism and photoelectric converting means.

7. A detector according to claim 6 wherein said light source is a luminous diode and said photoelectric converting means is a phototransistor.

* * * * *